(12) United States Patent
Igarashi et al.

(10) Patent No.: US 10,022,903 B2
(45) Date of Patent: Jul. 17, 2018

(54) METHOD OF MAKING A RESIN PANEL

(71) Applicant: KYORAKU CO., LTD., Kyoto-shi, Kyoto (JP)

(72) Inventors: Yu Igarashi, Tokyo (JP); Tadatoshi Tanji, Tokyo (JP); Tatsuya Fukuda, Tokyo (JP)

(73) Assignee: KYORAKU CO., LTD., Kyoto-Shi, Kyoto ( * ) Notice: Subject to any disclaimer, the term of this patent is extended or adjusted under 35 U.S.C. 154(b) by 522 days.

(21) Appl. No.: 14/673,513

(22) Filed: Mar. 30, 2015

(65) Prior Publication Data
US 2015/0202817 A1    Jul. 23, 2015

Related U.S. Application Data

(62) Division of application No. 13/775,739, filed on Feb. 25, 2013, now abandoned.

(30) Foreign Application Priority Data

Feb. 27, 2012    (JP) .................................. 2012-040625

(51) Int. Cl.
*B29C 49/04*    (2006.01)
*B29C 49/00*    (2006.01)
(Continued)

(52) U.S. Cl.
CPC ...... *B29C 49/0047* (2013.01); *B29C 47/0019* (2013.01); *B29C 47/0028* (2013.01); *B29C 47/366* (2013.01); *B29C 49/04* (2013.01); *B32B 3/12* (2013.01); *B32B 3/28* (2013.01); *B32B 3/30* (2013.01); *B32B 5/32* (2013.01); *B29C 47/0021* (2013.01); *B29C 47/0023* (2013.01); *B29C 47/0054* (2013.01); *B29C 47/368* (2013.01); *B29C 47/54* (2013.01); *B29C 47/904* (2013.01); *B29C 47/906* (2013.01);
(Continued)

(58) Field of Classification Search
None
See application file for complete search history.

(56) References Cited

U.S. PATENT DOCUMENTS

| 3,142,599 A | 7/1964 | Chavannes |
| 2002/0017805 A1 | 2/2002 | Carroll, III et al. |

FOREIGN PATENT DOCUMENTS

| EP | 0863056 A1 | 9/1998 |
| EP | 2343185 A1 | 7/2011 |

(Continued)

OTHER PUBLICATIONS

Extended European Search Report of the corresponding European Patent Application No. 13156846.1, dated Jun. 5, 2013.

(Continued)

*Primary Examiner* — Edmund H Lee

(57) ABSTRACT

A resin panel includes a first structure and a second structure stacked on each other. The structures includes reference surfaces that serve as the front surface and the back surface of the resin panel respectively. Each of the structures includes a plurality of protrusions protruding inwardly from the reference surface. The protrusions of the structure face the protrusions of the other structure each other. Jutting portions of linear shape are formed between adjacent protrusions of each of the structures. The structures are joined such that apical portions of the protrusions of each structure abut one another.

8 Claims, 15 Drawing Sheets

(51) Int. Cl.
  *B32B 3/30* (2006.01)
  *B32B 5/32* (2006.01)
  *B32B 3/12* (2006.01)
  *B32B 3/28* (2006.01)
  *B29C 47/36* (2006.01)
  *B29C 47/00* (2006.01)
  *B29L 31/30* (2006.01)
  *B29L 24/00* (2006.01)
  *B29L 22/00* (2006.01)
  *B29C 49/50* (2006.01)
  *B29C 51/30* (2006.01)
  *B29C 49/20* (2006.01)
  *B29C 49/48* (2006.01)
  *B29L 31/00* (2006.01)
  *B29L 31/10* (2006.01)
  *B29C 47/54* (2006.01)
  *B29C 47/90* (2006.01)
  *B29C 51/12* (2006.01)
  *B29C 51/26* (2006.01)
  *B29K 23/00* (2006.01)
  *B29K 25/00* (2006.01)

(52) U.S. Cl.
  CPC .......... *B29C 49/041* (2013.01); *B29C 49/50* (2013.01); *B29C 51/12* (2013.01); *B29C 51/262* (2013.01); *B29C 51/267* (2013.01); *B29C 51/303* (2013.01); *B29C 2049/0057* (2013.01); *B29C 2049/044* (2013.01); *B29C 2049/2065* (2013.01); *B29C 2049/4805* (2013.01); *B29C 2049/4812* (2013.01); *B29C 2791/001* (2013.01); *B29C 2791/006* (2013.01); *B29C 2791/007* (2013.01); *B29K 2023/12* (2013.01); *B29K 2025/06* (2013.01); *B29L 2022/005* (2013.01); *B29L 2024/00* (2013.01); *B29L 2031/10* (2013.01); *B29L 2031/3041* (2013.01); *B29L 2031/776* (2013.01); *B32B 2419/00* (2013.01); *B32B 2605/00* (2013.01); *B32B 2607/00* (2013.01); *Y10T 428/24826* (2015.01)

(56) References Cited

FOREIGN PATENT DOCUMENTS

| | | |
|---|---|---|
| JP | 06-226889 A | 8/1994 |
| JP | 09-141769 A | 6/1997 |
| JP | 10-250514 A | 9/1998 |
| JP | 2000-326430 A | 11/2000 |
| JP | 2009-107144 A | 5/2009 |
| WO | 2010-050242 A1 | 5/2010 |

OTHER PUBLICATIONS

European Office Action of the corresponding European Patent Application No. 13156846.1, dated Jul. 24, 2014.

A-A CROSS SECTION

X-X CROSS SECTION AND Y-Y CROSS SECTION

Z-Z CROSS SECTION

METHOD OF MAKING A RESIN PANEL

CROSS-REFERENCE TO RELATED APPLICATIONS

This application is a division application that claims priority to U.S. application Ser. No. 13/775,739, filed Feb. 25, 2013, now abandoned. U.S. application Ser. No. 13/775,739 further claims priority to Japanese Patent Application No. 2012-040625 filed on Feb. 27, 2012. The contents of U.S. application Ser. No. 13/775,739 and Japanese Patent Application No. 2012-040625 are hereby incorporated by reference in their entirety.

BACKGROUND OF THE INVENTION

1. Field of the Invention

The present invention relates to a resin panel, a sandwich panel in which the resin panel is covered by skin sheets, and relates to a molding technique therefor.

2. Description of the Related Art

Conventionally, sandwich panels have been employed in a wide range of applications, from those in transportation machinery such as automobiles, airplanes, and the like, to those in construction, electrical equipment housings, sports and leisure, and so on. A sandwich panel has a core material of a resin panel covered by skin sheets; in some, only one surface of the core material is covered by skin sheets, while in others, both surfaces of the core material are covered by skin sheets. Sandwich panels in which only one surface of the core material is covered by skin sheets are employed, for example, in applications such as construction, in which it is not necessary for the other surface of the core material to be covered by skin sheets since it is not visible to the user. Sandwich panels in which both surfaces of the core material are covered by skin sheets are also referred to as sandwich panels. A sandwich panel has two skin sheets, and a core material interposed between both of the skin sheets. Specifically, the basic format of a sandwich panel is a stacked structure of one skin sheet, a core material, and another skin sheet.

Sandwich panels of a core material of expanded resin (that is, resin foam) covered by skin sheets have been known (for example, see International Publication Pamphlet No. WO 2010/050242). The core material of this sandwich panel has a plurality of hollows that form voids in the interior, with appropriate setting of the number of hollows and the total opening area, thereby ensuring compressive stiffness.

SUMMARY OF THE INVENTION

With conventional resin panels, and with sandwich panels in which a core material of a resin panel is covered by skin sheets, there is a need for further improvement in strength.

It is therefore an object of the present invention to provide a resin panel and a sandwich panel of greater strength than in the past.

A first aspect of the present is a method of making a resin panel. The method includes extruding a first molten resin material in a vertically downward direction between a pair of split molds, molding surfaces of the split molds including corresponding molding protrusions extending therefrom. The method also include extruding a second molten resin material in the vertically downward direction between the pair of split molds. The method further includes moving a first of the pair of split molds and a second of the pair of split molds toward one another with the first and second molten resin materials extending therebetween. As well, the method includes blowing the first molten resin material against the first of the pair of split molds forming a first structure. Further, the method includes blowing the second molten resin material against the second of the pair of split molds forming a second structure. Each of the first and second downwardly extruded structures is formed with corresponding reference surfaces that serve as a front surface and a back surface of the resin panel, respectively. The blowing of the first and the second molten resin materials further includes forming a plurality of protrusions protruding inwardly from respective ones of the reference surfaces corresponding to the molding protrusions formed on the molding surfaces of the split molds. The protrusions of one of the first and second structures faces the protrusions of the other of the first and extruded structures. The first and second structures are joined such that apical portions of the protrusions of one of the first and second structures abut apical portions of the protrusions of the other of the first and second structures, and jutting portions having a linear shape are formed between adjacent protrusions of each of the first and second structures during the blowing of the first and second molten resin materials. However, the molding surfaces of the split molds do not having jutting portions formed thereon.

In the aforedescribed resin panel, in a preferred embodiment, a plurality of the jutting portions of linear shape may be formed for each of the protrusions, such that at least two of the jutting portions do not extend in two opposite directions.

In a preferred embodiment, the jutting portions of linear shape formed for each of the protrusions may extend in two opposite directions.

In a preferred embodiment, the resin panel may be made from expanded material.

A second aspect of the present invention is a sandwich panel including resin sheets, and the above-described resin panel sandwiched between the resin sheets.

BRIEF DESCRIPTION OF THE DRAWINGS

Referring now to the attached drawings which form a part of this original disclosure.

DESCRIPTION OF THE PREFERRED EMBODIMENTS

As an embodiment of the sandwich panel of the present invention, a sandwich panel, and a molding method therefor, are described below.

(1) Sandwich Panel

The sandwich panel 1 of the embodiment is described below with reference to FIGS. 1 and 2.

Figure 1:
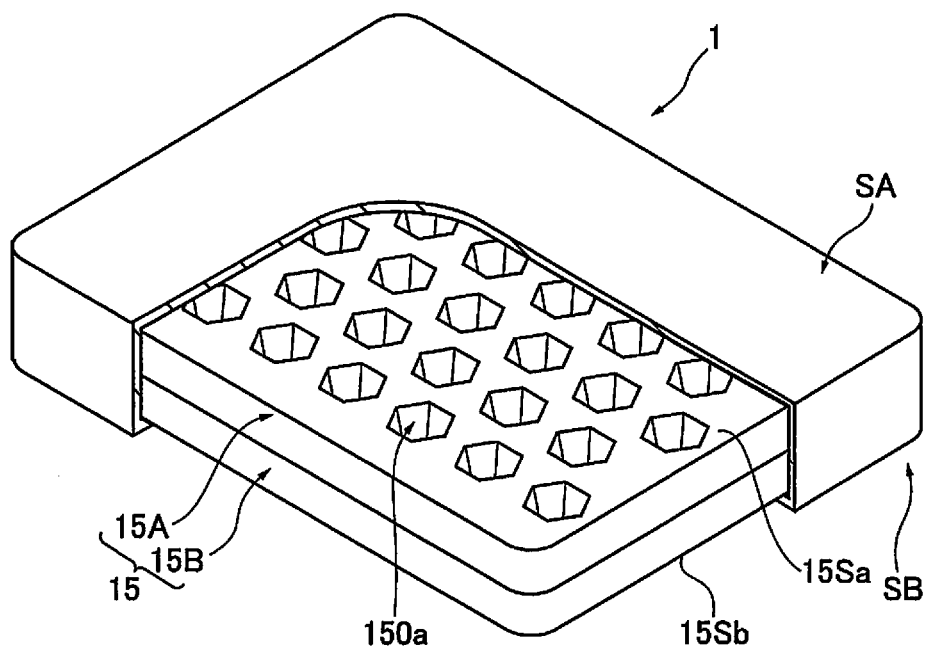
FIG. 1 is an overall perspective view of a sandwich panel of an embodiment.

As illustrated in FIG. 1 by way of example, the sandwich panel 1 of the embodiment is equipped with an exterior shape that is approximately cuboid. This sandwich panel 1 is furnished on both the front surface side and the back surface side with resin sheets SA, SB of a thermoplastic resin, thereby providing a sandwich structure in which a core material 15 (resin panel) is sandwiched interposed between the resin sheets on the front surface side and the back surface side. The resin sheets SA, SB are served as the thin skin sheets of the sandwich panel 1, and are obtained by forming, within a mold, resin sheets (molten resin) extruded by an extrusion device.

In the sandwich panel 1 of the embodiment, the core material 15 is molded from a thermoplastic resin, for example. The thermoplastic resin material is not limited, and may include, for example, polypropylene, polyethylene, or other polyolefins, polyamides, polystyrene, polyvinyl chloride, and other acrylic derivatives, and mixtures of two or more kinds of these. In preferred embodiment, the core material 15 occupies a large proportion of the volume of the sandwich panel 1, and is made of expanded resin that has been expanded with a blowing agent for lighter weight. The expansion ratio of the expanded resin serving as the core material 15 is in the range of 1.5 to 6, for example. Herein, the expansion ratio is a value obtained by dividing the density of the mixed resin prior to expansion, by the apparent density of the expanded resin after expansion.

The apparent expansion ratio of the entire expansion-molded article, including the hollow portions, may be in the range of 10 to 60, for example, and may be 30 as a representative value. This apparent expansion ratio is a value obtained by dividing the density of the mixed resin prior to expansion, by the density of the entire expansion-molded article, including the hollow portions.

In the sandwich panel 1 of the embodiment, the resin sheets SA, SB are not limited as to the resin material thereof, but in preferred embodiment, will be formed from non-expanded resin in order to ensure rigidity of the sandwich panel 1. For example, in consideration of moldability, the resin sheets SA, SB may have polypropylene (PP) as the primary material, with polystyrene (PS) and a styrene-ethylene-butylene-styrene block copolymer resin (SEBS) mixed in.

The resin sheets SA, SB and the core material 15 may be molded from a resin material into which a glass filler has been admixed for the purpose of increasing the rigidity and strength.

As glass fillers, there may be cited glass fibers, glass fiber fabrics such as glass cloth or glass nonwoven fabric, glass beads, glass flakes, glass powder, milled glass, and the like. As types of glass, there may be cited E glass, C glass, A glass, S glass, D glass, NE glass, T glass, quartz, low-permittivity glass, high-permittivity glass, and the like.

There is no limitation to the glass fillers; other inorganic fillers, such as talc, calcium carbonate, wollastonite, magnesium based materials, or carbon fibers or the like, may be admixed in order to raise the rigidity.

The thickness of the core material 15 is determined, as appropriate, according to the target thickness of the sandwich panel 1, as well as to the thickness of the resin sheets for ensuring that the sandwich panel 1 has the target rigidity. The thickness may be, but not particularly limited to, about 10 mm, for example. The thickness of the resin sheets SA, SB may be preferably within the range of 0.1 mm to 0.6 mm, and may be 0.5 mm as a representative value.

Next, the structure of the core material 15 serving as the resin panel is described with reference to FIGS. 2 to 5.

Figure 2:
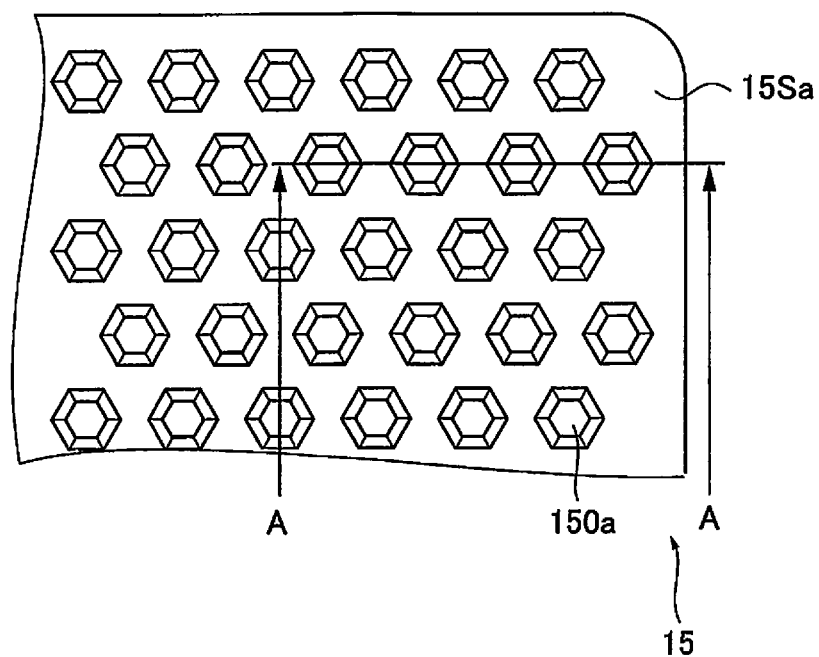
FIG. 2 is a plan view of the core material of the sandwich panel of the embodiment.
Figure 3:
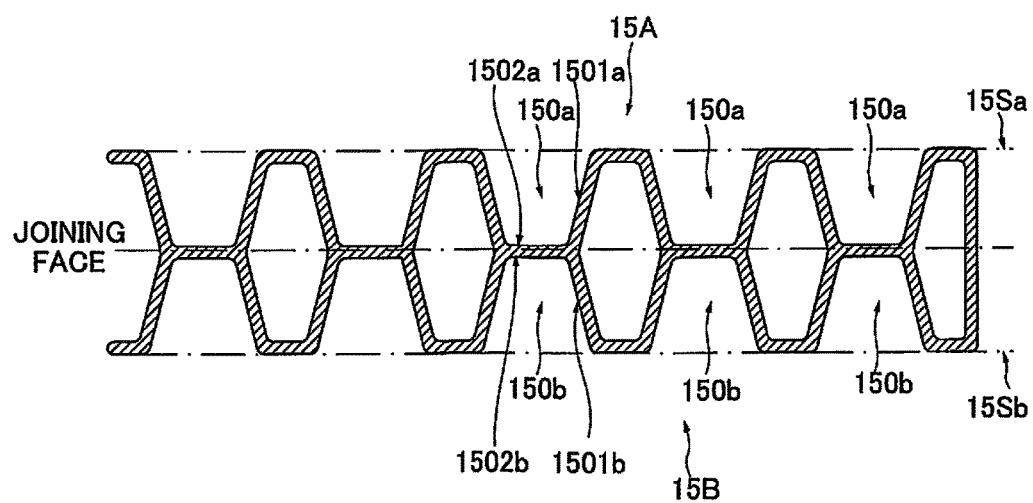
FIG. 3 is a drawing illustrating the A-A cross section in FIG. 2.
Figure 4A:
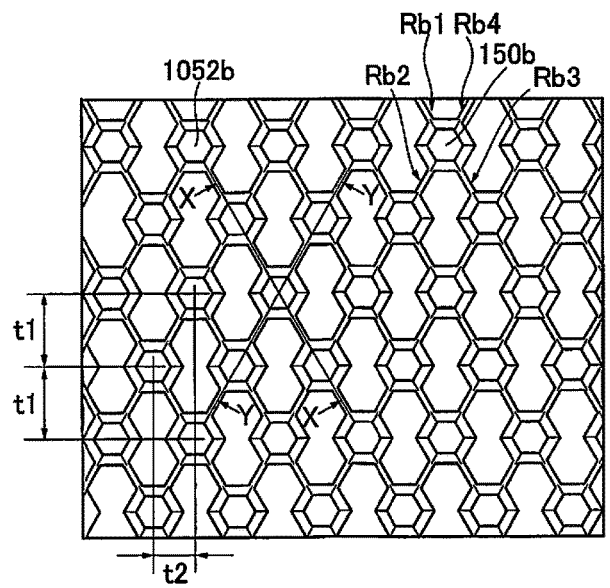
FIG. 4A is a plan view of the structure of the lower side of the core material of a first example of the embodiment when cut at the joining surface.
Figure 4B:
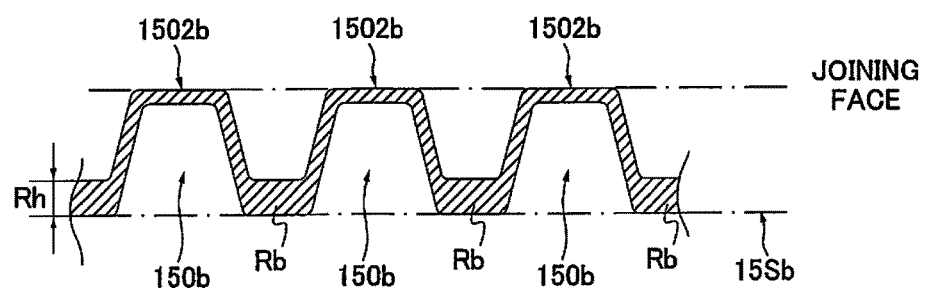
FIG. 4B is the X-X cross section and the Y-Y cross section in FIG. 4A.
Figure 5A:
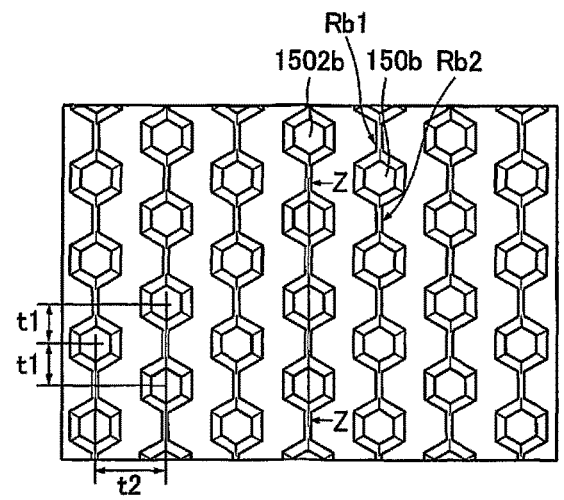
FIG. 5A is a plan view of the structure of the lower side of the core material of a second example of the embodiment when cut at the joining surface.
Figure 5B:
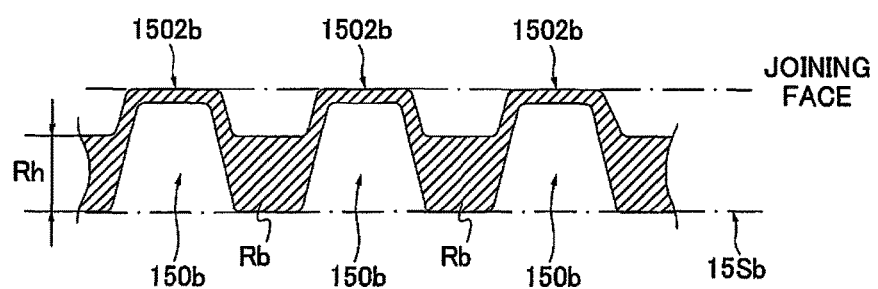
FIG. 5B is the Z-Z cross section in FIG. 5A.

FIG. 2 is a fragmentary plan view of the core material 15 of the sandwich panel 1 of the embodiment. FIG. 3 is a drawing illustrating the A-A cross section in FIG. 2. FIGS. 4A, 4B and 5A, 5B are drawings illustrating examples of the structure when the core material 15 of the embodiment has been cut at the joining surface. FIG. 4A illustrates a plan view, while FIG. 4B is the X-X cross section and the Y-Y cross section in FIG. 4A. FIG. 5A illustrates a plan view, while FIG. 5B is the Z-Z cross section in FIG. 5A.

As illustrated in FIG. 3, in the core material 15, a first structure 15A and a second structure 15B are joined at a joining surface, thereby producing a structure in which the first structure 15A and the second structure 15B are stacked on each other. A reference surface 15Sa of the first structure 15A is corresponding to the front surface of the core material 15, while a reference surface 15Sb of the second structure 15B is corresponding to the back surface of the core material 15.

On the first structure 15A are formed a plurality of protrusions 150a that protrude inwardly from the reference surface 15Sa. In a preferred embodiment, the plurality of protrusions 150a are furnished so as to be aligned in rows in a predetermined pattern over the entire face of the reference surface 15Sa corresponding to the front surface of the core material 15, as illustrated in FIG. 2. With this arrangement, the rigidity and strength in the direction of compression against the front surface of the core material 15 can be increased. While the front surface is illustrated in FIG. 2, the back surface has a comparable structure. That is, in a preferred embodiment, the plurality of protrusions 150b are furnished so as to be aligned in rows in a predetermined pattern over the entire face of the reference surface 15Sb corresponding to the back surface of the core material 15, whereby the rigidity and strength in the direction of compression against the back surface of the core material 15 can be increased.

Referring to the first structure 15A in FIG. 3, the protrusions 150a have a tapered surface 1501a formed so as to taper off towards the inward side, and an apical portion 1502a. By tapering off the tapered surface 1501a of each protrusion 150a towards the inward side, the protrusions 150a are more resistant to buckling in response to a large load on the front surface of the core material 15, thereby increasing the strength in the direction of compression against the front surface of the core material 15.

Referring to the second structure 15B in FIG. 3, the protrusions 150b have a tapered surface 1501b formed so as to taper off towards the inward side, and an apical portion 1502b. By tapering off the tapered surface 1501b of each protrusion 150b towards the inward side, the protrusions 150b are more resistant to buckling in response to a large load on the back surface of the core material 15, thereby increasing the strength in the direction of compression against the back surface of the core material 15.

As illustrated in FIG. 3, the protrusion 150a of the first structure 15A and the protrusions 150b of the second structure 15B are joined such that their respective apical portions 1502a, 1502b abut, whereby the core material 15 is constructed such that the first structure 15A and the second structure 15B are stacked with the both structured joined.

In the first structure 15A and the second structure 15B which form the core material 15 of the present embodiment, jutting portions (raised folds) of linear shape are formed between adjacent protrusions of each of the structures; this feature is described with reference to FIGS. 4A, 4B and 5A, 5B. FIGS. 4A, 4B and 5A, 5B illustrate specific examples of the structures of the core material 15 of the present embodiment. In FIGS. 4A, 4B and 5A, 5B, only the second structure 15B is illustrated, and only the second structure 15B is mentioned below; however, the first structure 15A is comparable in structure.

In FIGS. 4A and 5A, illustrated is a plan view of the cut joining surface of the core material 15, seen from the inward side (that is, seen from the side of the apical portion 1502b of the protrusions 150b). In FIGS. 4B and 5B, illustrated is a cross sectional view of the second structure 15B when cut along the direction of the jutting portions which are furnished between the protrusions. In FIGS. 4 and 5, the jutting portions are furnished along the reference surface 15Sb corresponding to the back surface of the core material 15.

Firstly, in the example illustrated in FIG. 4A, four jutting portions Rb1 to Rb4 of linear shape (referred to collectively as "jutting portions Rb" when appropriate) are furnished between each protrusion 150b and other protrusions 150b. Of these four jutting portions Rb1 to Rb4, at least two jutting portions are formed so as to not extend in two mutually opposite directions. In other words, a group of the jutting portions Rb1 are collinear. Other groups of the jutting portions Rb1 are parallel to one another. Similarly, a group of the jutting portions Rb4 are collinear. Other groups of the jutting portions Rb4 are parallel to one another. For each pair of one of the jutting portions Rb1 and one of the jutting portions Rb4, an angle is defined therebetween. The protrusions 150b are hexagonal and the jutting portions Rb1, Rb2, Rb3 and Rb4 extend outwardly away from apexes of the protrusions 150b. Consequently, the angle defined between the jutting portions Rb1 and Rb4 is 60 degrees (an acute angle) and the angle defined between the jutting portions Rb2 and Rb3 is also 60 degrees. Further, the jutting portions Rb1 and Rb2 do not extend in two mutually opposite directions, and the jutting portions Rb1 and Rb4 do not extend in two mutually opposite directions. In other words, the jutting portions Rb1 and Rb2 are not parallel to one another nor are the perpendicular to one another. That is, in the example illustrated in FIG. 4, the jutting portions Rb are formed between protrusions 150b that are adjacent in at least two non-opposite directions in plan view, whereby the jutting portions Rb function as reinforcing ribs against bending moment exerted in any direction on the reference surface 15Sb. This allows a structure resistant to collapse of the protrusions 150b in response to bending moment acting on the back surface, and therefore the bending rigidity and bending strength can be increased. In the example illustrated in FIG. 4A, the jutting portions Rb constituting interstices between the protrusions 150b are formed to extend in two intersecting directions overall. This allows a structure that is strong with respect to bending moment centered on any straight line in the longitudinal direction or lateral direction in FIG. 4A.

Next, in the example of FIG. 5A, two jutting portions Rb1, Rb2 of linear shape are furnished between each protrusion 150b and other protrusions 150b. These two jutting portions Rb1, Rb2 of linear shape extend in two mutually opposite directions. That is, in FIG. 5A, the jutting portions Rb constituting interstices between the protrusions 150b extend in a single longitudinal direction overall. Therefore, the jutting portions Rb1, Rb2 function as reinforcing ribs against bending moment the action of which is centered on a line in the lateral direction in FIG. 5A, thereby providing a structure extremely resistant to the bending moment. The structure is relatively low in bending rigidity with respect to bending moment centered on a line in the direction of overall extension of the jutting portions Rb. Consequently, the structure illustrated in FIGS. 5A and 5B is particularly useful in cases in which higher bending rigidity and bending strength are desired in a specific direction.

The first structure 15A and the second structure 15B are formed in individual blow molding processes, by forcing the molten resin against the respective split molds. Protrusions corresponding to the protrusions 150a, 150b are formed on the split molds, whereas shapes corresponding to the jutting portions are not formed on the split molds. The jutting portions illustrated in FIGS. 4A, 4B and 5A, 5B are formed through the arrangement of the protrusions formed on the split molds in correspondence with the protrusions 150a, 150b, through the direction of injection of the molten resin, and so on.

For example, in a case in which t1>t2, there are formed jutting portions of intersecting shape overall as illustrated in FIG. 4A, whereas in a case in which t1<t2, there readily form jutting portions of linear shape overall in a single direction as illustrated in FIG. 5A. In FIGS. 4A and 5A, the direction extending from the top towards the bottom on the plane of the page corresponds to the direction of injection of the molten resin, and in this case, examples of preferred dimensions of the jutting portions when formed to the shapes as illustrated in FIGS. 4A, 4B and 5A, 5B are as follows.

Specifically, with regard to distances between the centers of adjacent protrusions 150b in the case of FIGS. 4A and 4B, the distance t1 in the injection direction is 11 mm for example, and the distance t2 in a direction orthogonal to the injection direction is 5.5 mm, for example. In a case in which the height of the protrusions (equal to the width of the structure) is 12 mm, the height Rh of the jutting portions formed therebetween is 0.5 to 3 mm. In the case of FIGS. 5A and 5B on the other hand, t1=5.5 mm and t2=11 mm, and in a case in which the height of the protrusions (equal to the width of the structure) is 12 mm, the height Rh of the jutting portions formed therebetween is 1 to 5 mm.

As mentioned previously, in FIGS. 4 and 5, the direction from the top towards the bottom on the plane of the page corresponds to the direction of injection of the molten resin in the molding step, to be discussed below. By introducing filler into the molten resin, the bending rigidity and bending strength against bending moment centered on the direction of injection, that is, on a line in a horizontal direction in FIG. 4 or 5, can be increased further. As the introduced filler, in addition to the various glass fillers mentioned previously, inorganic fillers, such as talc, calcium carbonate, wollastonite, magnesium based materials, or carbon fibers or the like, may be admixed.

In the sandwich panel 1 of the present embodiment, any of the widely known physical blowing agents or chemical blowing agents, or mixtures of these, can be cited as examples of blowing agents that may be used in the core material 15. For example, as the physical blowing agents, air, carbon dioxide gas, nitrogen gas, or other such inorganic physical blowing agents, as well as butane, pentane, hexane, dichloromethane, dichloroethane, and other such organic physical blowing agents can be applied. As the chemical blowing agents, there may be cited, for example, organic blowing agents such as azodicarbonamide (ADCA), N,N'-dinitrosopentamethylene tetramine, 4,4'-oxybis(benzenesulfonyl hydrazide), diphenylsulfone-3,3'-disulfonyl hydrazide, p-toluenesulfonyl semicarbazide, trihydrazinotriazine, azobisisobutyronitrile, and the like; as well inorganic blowing agents such as mixtures of polycarboxylic acids, such as citric acid, oxalic acid, fumaric acid, phthalic acid, malic acid, tartaric acid, cyclohexane-1,2-dicarboxylic acid, camphoric acid, ethylenediaminetetraacetic acid, triethylenetetramine hexaacetic acid, nitrilo acid, and the like, with inorganic carbonic acid compounds such as sodium hydrogen carbonate, aluminum sodium hydrogen carbonate, potassium hydrogen carbonate, ammonium hydrogen carbonate, ammonium carbonate, and the like; or sodium dihydrogen citrate, potassium oxalate, and other salts of polycarboxylic acids.

(2) Core Material Molding Method

The molding method for the core material 15 is described next.

Firstly, a polyolefin based resin, for example, is fed to an extruder (not illustrated), in which, after kneading the material while heating and melting it, a predetermined amount of a blowing agent is added, continuing to further knead within the extruder to give an expandable molten resin. While maintaining the expandable molten resin at a resin temperature suitable for expansion, but at a pressure such that the expandable molten resin does not begin to expand, the material is packed into an accumulator (not illustrated). Next, with the gate at the distal end of the die of the extrusion head 40 open, the ram of the accumulator (not illustrated) is pushed in order to release the expandable molten resin into a low-pressure zone, forming an expandable cylindrical parison P. A substantially constant expansion ratio is maintained throughout the molding step by split molds 50A, 50B in a subsequent step.

Figure 6:
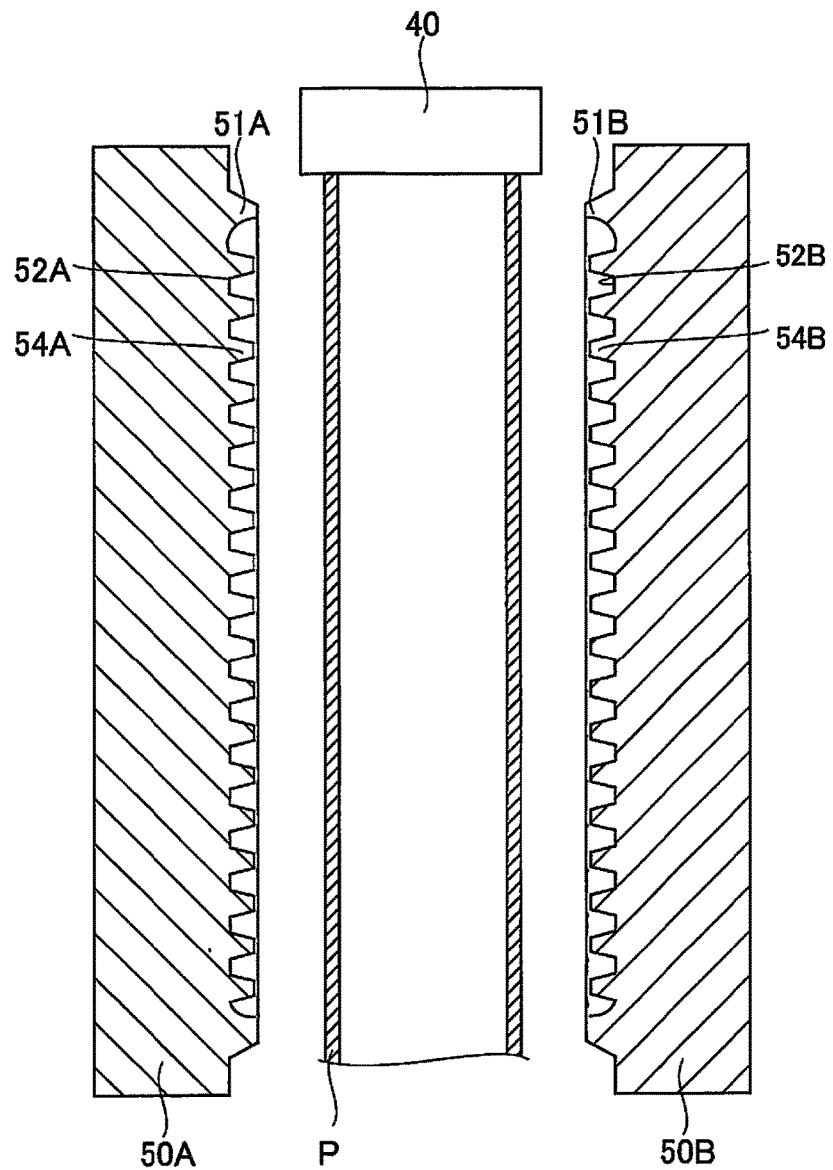
FIG. 6 is a drawing illustrating a state prior to clamping of the mold in the molding step for the core material of the embodiment.

Next, as illustrated in FIG. 6, the cylindrical parison P in a molten state is extruded vertically downward through a slit die by the known-art extrusion head 40, and the cylindrical parison P is continuously fed in a molten state between the two split molds 50A, 50B at the open position.

Figure 7:
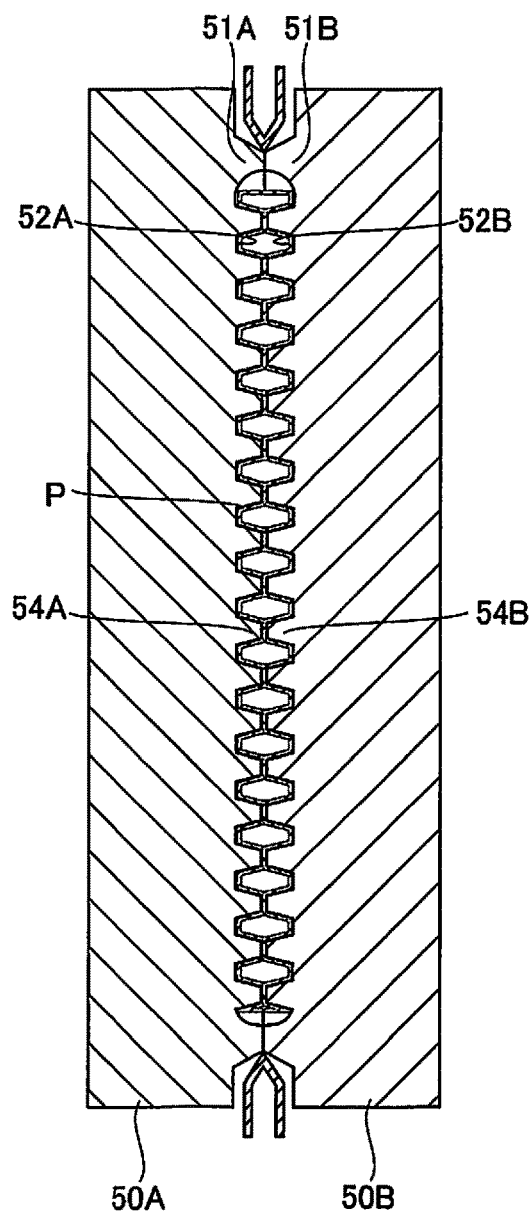
FIG. 7 is a drawing illustrating a mold-clamped state in the molding step for the core material of the embodiment.

Next, as illustrated in FIG. 7, the two split molds 50A, 50B move from the open position to the closed position, and the two split molds 50A, 50B are clamped. A sealed space (cavity) is formed accordingly. Next, through blow molding or vacuum molding through the cavity, the parison P inside the cavity is shaped to conform to molding surfaces 52A, 52B within the cavity.

In further detail, in the case of blow molding, in a manner comparable to known prior art methods, a blow pin (not illustrated) is inserted into the core material 15, and a pressurized fluid is introduced into the interior, pressing the parison P towards the molding surfaces 52A, 52B of the split molds 50A, 50B; or in the case of vacuum molding, in a manner comparable to known prior art methods, the split molds 50A, 50B are furnished with channels (not illustrated) therein which communicates with the cavity, and the cavity is suctioned through these channels, whereby the parison P is suctioned towards the molding surfaces 52A, 52B of the split molds 50A, 50B, bringing the parison P into close contact with the molding surfaces 52A, 52B. The structures 15A, 15B are thereby made from the continuous cylindrical parison P in the molten state. Specifically, a plurality of protrusions 54A, 54B, corresponding to the plurality of protrusions 150a, 150b of the structures 15A, 15B, have been furnished on the molding surfaces 52A, 52B of the split molds 50A, 50B. That is, when the parison P comes into close contact with the molding surfaces 52A, 52B, the parison P comes into close contact against the plurality of protrusions 54A, 54B on the molding surfaces 52A, 52B, thereby forming the plurality of protrusions 150a, 150b on the structures 15A, 15B. At this time, by adopting a mirror pattern of arrangement of the plurality of protrusions 54A, 54B on each of the molding surfaces 52A, 52B of the split molds 50A, 50B, the apical portions 1502a, 1502b of the corresponding protrusions 150a, 150b of the respective structures 15A, 15B come into abutment and are welded to one another. Furthermore, pinch-off portions 51A, 51B of the individual split molds 50A, 50B come into abutment to weld the continuous cylindrical parison P, while simultaneously forming parting lines PL at the peripheral edge portions thereof.

As mentioned previously, through appropriate arrangement of the plurality of protrusions 54A, 54B of the split molds 50A, 50B in conformity to the protrusions 150a, 150b, subsequent to molding, jutting portions of rib shape will have formed between the adjacent protrusions 150a and the adjacent protrusions 150b, in each of the pair of structures 15A, 15B.

Figure 8:
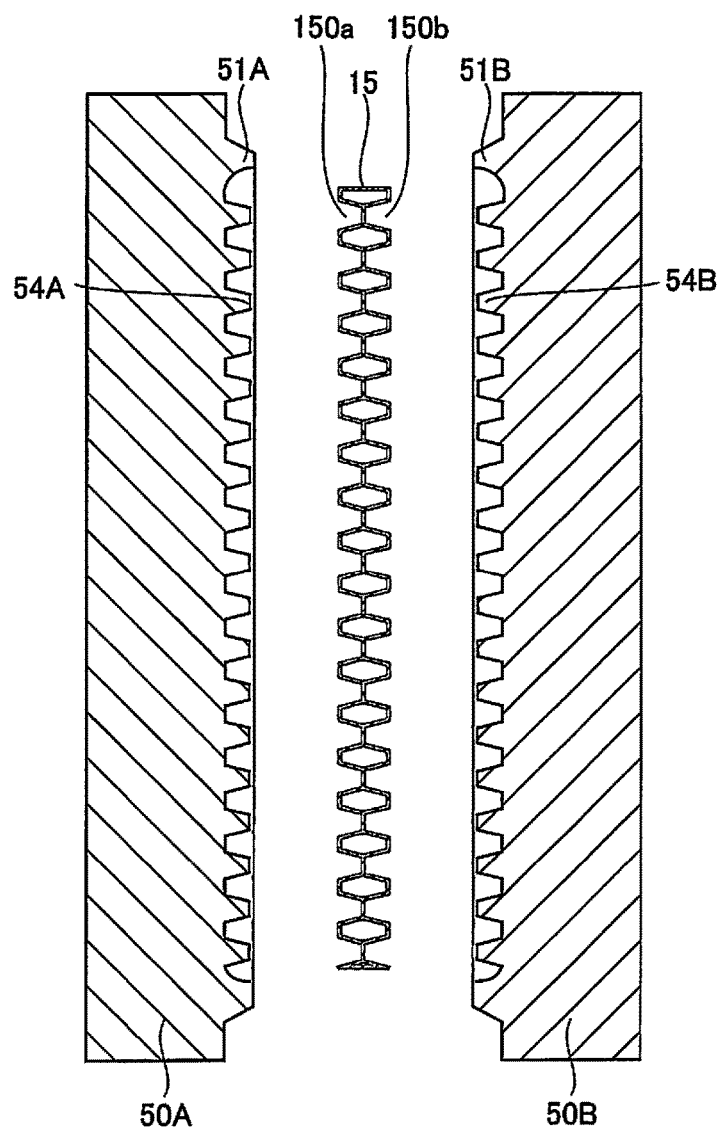
FIG. 8 is a drawing illustrating a state subsequent to clamping of the mold in the molding step for the core material of the embodiment.

Next, as illustrated in FIG. 8, the two split molds 50A, 50B are moved from the closed position to the open position by the mold driving device, parting the two split molds 50A, 50B. The molded core material 15 is thereby released from the two split molds 50A, 50B.

This completes the molding of the expandable core material 15.

(3) Sandwich Panel Molding Method

Next, the device and method for employing a mold to mold the sandwich panel 1 of the embodiment is described with reference to FIGS. 9 to 15.

Firstly, the molding device for the sandwich panel 1 of the embodiment is described.

Figure 9:
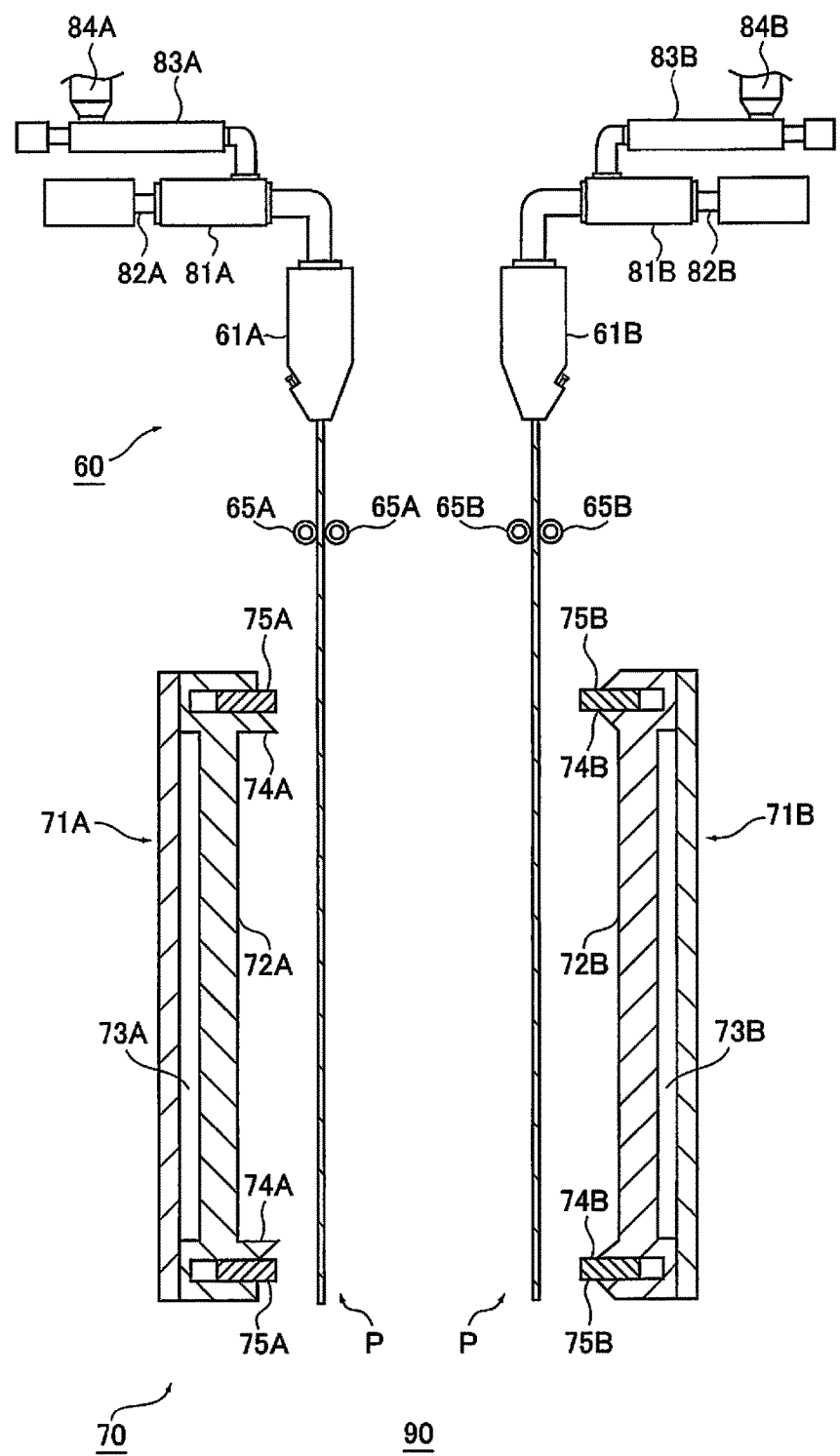
FIG. 9 is a drawing illustrating the overall arrangement of the sandwich panel molding device of the embodiment.

As illustrated in FIG. 9, the molding device 90 of the embodiment has an extrusion device 60, and a mold clamping device 70 arranged below the extrusion device 60. Resin sheets P in the molten state extruded from the extrusion device 60 are delivered to the mold clamping device 70, and the resin sheets P in the molten state are molded in the mold clamping device 70. FIG. 9 illustrates in cross section only the mold clamping device 70 and the resin sheets P in the molten state.

The extrusion device 60 is equipped with T-dies 61A, 61B, accumulators 81A, 81B, plungers 82A, 82B, extruders 83A, 83B, and resin feed hoppers 84A, 84B. In the extrusion device 60, the extruders are employed to plasticize and melt a resin feedstock, and this molten resin is then extruded out from the T-dies 61A, 61B. In the extrusion device 60, the extrusion capability of the extruders 83A, 83B can be selected, as appropriate, depending on the size of the sandwich panel 1. From the standpoint of a shorter molding cycle for the sandwich panel 1, 50 kg/hour or greater is preferred.

In the extrusion device 60, the rate at which the resin sheet is extruded is set by the T-dies 61A, 61B and the accumulators 81A, 81B. From the standpoint of preventing drawdown, in a preferred embodiment, extrusion of the resin sheet from the T-dies 61A, 61B will be completed within 40 seconds, and more preferably completed within 30 seconds. Therefore, in a preferred embodiment, the molten resin material accumulated in the accumulators 81A, 81B will be extruded from the T-dies 61A, 61B at 50 kg/hour or more, and preferably 60 kg/hour or more, per 1 cm$^2$. At this time, the effects of drawdown can be minimized further by varying the slits in the die tips of the T-dies 61A, 61B, according to the extrusion rate of the resin sheet. Specifically, the clearance of the slits of the T-dies 61A, 61B can be progressively widened from the outset of extrusion, reaching a maximum at the end of extrusion, thereby minimizing variation in thickness due to the weight of the resin sheet, so that the resin sheet can be given uniform thickness over a wide range in the vertical direction. The resin sheet can thereby be given uniform thickness at the point in time that the pair of split molds are moved from the open position to the closed position, discussed below.

Referring back to FIG. 9, the mold clamping device 70 has a pair of split molds 71A, 71B that are moved between the open position and the closed position, in a direction generally orthogonal to the direction of feed of the resin sheets P in the molten state. The pair of split molds 71A, 71B are arranged in a state with each of their corresponding molding surfaces 72A, 72B in opposition. The surfaces of the molding surfaces 72A, 72B may be furnished with land and groove portions generally corresponding in shape to the external shape of the sandwich panel 1.

In each of the pair of split molds 71A, 71B, pinch-off portions 74A, 74B are formed in proximity to the upper and lower ends of each of their corresponding molding surfaces 72A, 72B. The pinch-off portions 74A, 74B are respectively formed to an annular shape around the molding surfaces 72A, 72B, and project out towards the opposing split mold 71A, 71B. In so doing, when the pair of split molds 71A, 71B are clamped together, the respective pinch-off portions 74A, 74B abut at their distal ends, forming parting lines PL at the peripheral edges of the resin sheets P in the molten state.

The pair of split molds 71A, 71B are furnished at the perimeter of the molding surfaces 72A, 72B with sliding portions 75A, 75B capable of projecting out from the molding surfaces 72A, 72B. In a state in which the sliding portions 75A, 75B are projected out from the molding surfaces 72A, 72B, the end surfaces thereof come into contact with the resin sheets P, thereby forming sealed spaces (cavities) between the resin sheets P and the molding surfaces 72A, 72B of the pair of split molds 71A, 71B.

The pair of split molds 71A, 71B house vacuum chambers 73A, 73B. The vacuum chambers 73A, 73B are connected to a vacuum pump and a vacuum tank (neither is illustrated). Between the vacuum chambers 73A, 73B and the molding surfaces 72A, 72B are furnished communicating passages (not illustrated) communicating with the cavities for the purpose of vacuum suction.

The pair of split molds 71A, 71B, driven by a mold driving device (not illustrated), are moveable between the open position and the close position. At the open position, the two continuous resin sheets P in the molten state may be arranged, spaced apart from one another across a gap, between the pair of split molds 71A, 71B. Subsequent to molding, the two resin sheets P has become the resin sheets SA, SB of the sandwich panel 1. At the closed position, through abutment of the pinch-off portions 74A, 74B of the pair of split molds 71A, 71B, when each of the pair of split molds 71A, 71B moves from the open position to the closed position, cavities form within the split molds 71A, 71B, with respect to the two resin sheets P in the molten state. The molds are driven in such a way as to move towards the position of the centerline of the pair of split sheets P.

Next, the molding method of the sandwich panel 1 is described.

Firstly, as illustrated in FIG. 9, the resin sheets P in the molten state are extruded vertically downward by the extrusion device 60, from each of the die slits. The extruded resin sheets P respectively pass through rollers 65A, 65B and are fed between the pair of split molds 71A, 71B. At this point in time, the pair of split molds 71A, 71B are in the open position.

In a case in which a decorative sheet (for example, a decorative sheet made of fabric) is to be applied to the surface of the sandwich panel 1, the descending resin sheets P and the decorative sheet can be bonded to one another by the rollers 65A, 65B. At this time, in terms of stronger adhesion to the resin sheets P, it is better that the decorative sheet be fabric-like on its inner surface. In a preferred embodiment, the surfaces of the rollers 65A, 65B will be coated with a thin film of fluorine, and heated to about 70 to 100° C., to prevent sticking of the resin and to improve adhesive strength.

Alternatively, a decorative sheet may be positioned in advance on the molding surface of the split mold, inducing the decorative sheet to adhere the resin sheet P simultaneously with molding of the resin sheet P.

Decorative sheets made of fabric are preferably of nonwoven fabric. In terms of improving the adhesive strength, it is especially preferable to employ a needle-punched nonwoven fabric in which the fibers have been mechanically entangled by pricking with barbed needles.

Figure 10:
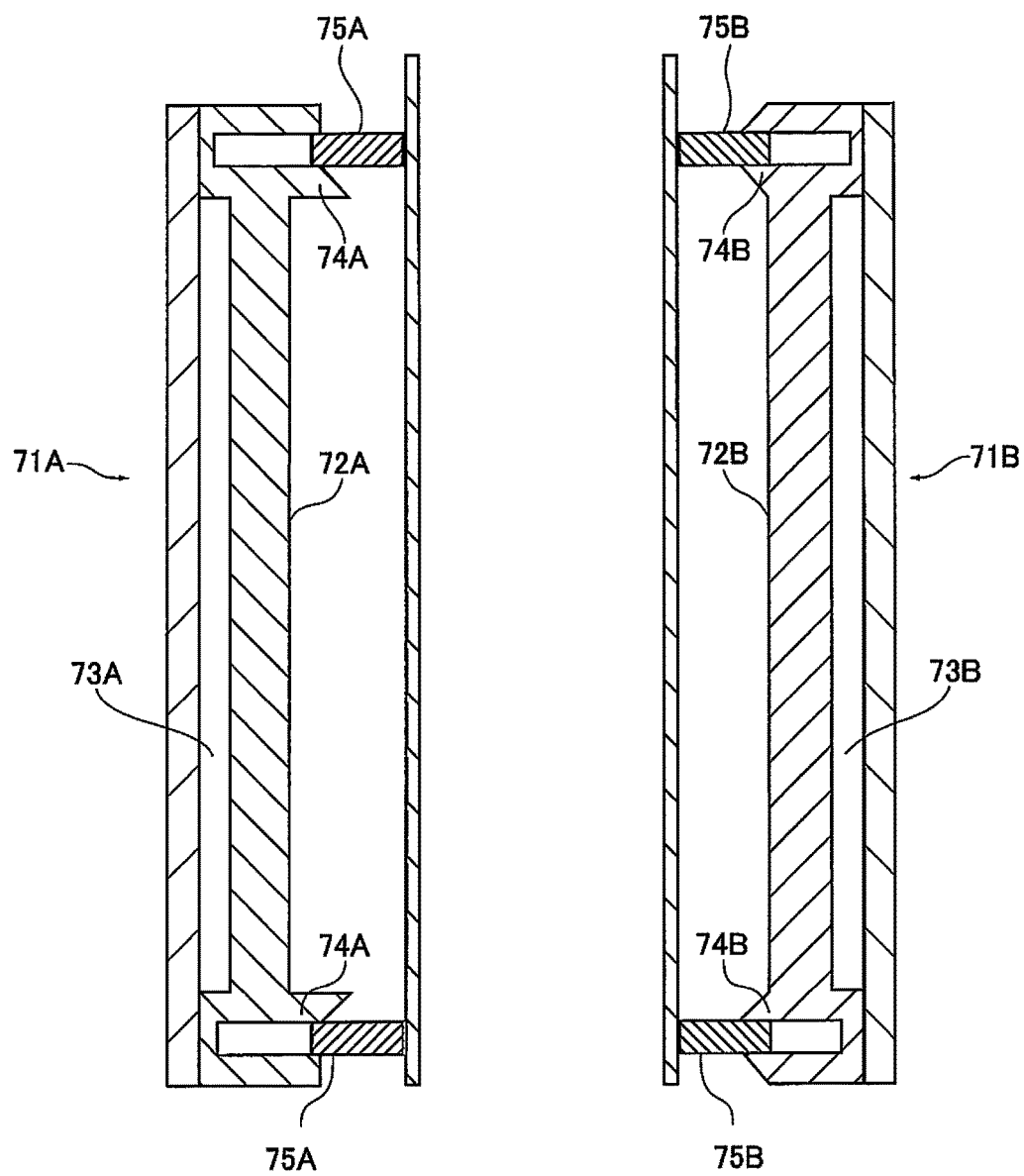
FIG. 10 is a drawing illustrating a state in which a cavity has formed between the resin sheet and the molding surface of the split mold in the molding process for the sandwich panel of the embodiment.
Figure 11:
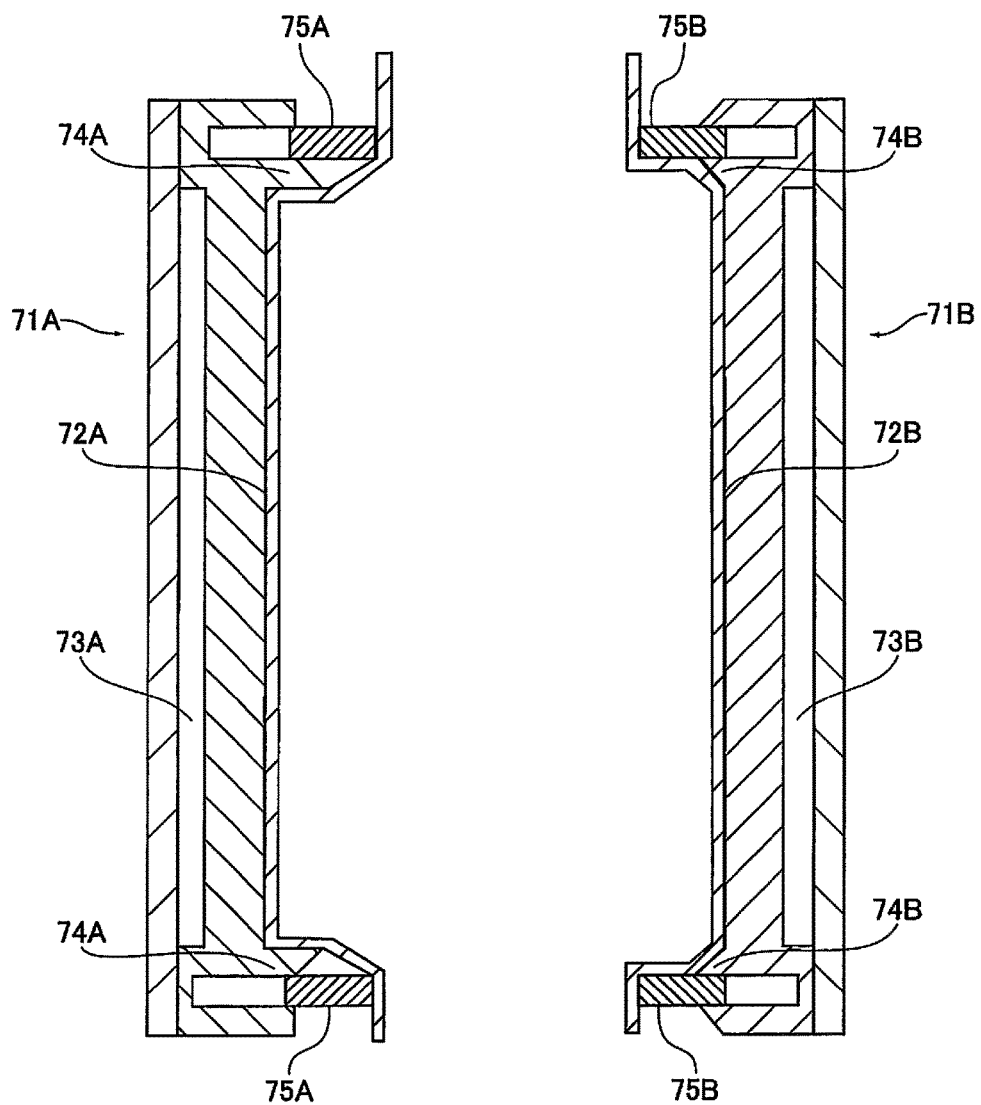
FIG. 11 is a drawing illustrating a state in which the resin sheet has formed to a shape conforming to the molding surface of the split mold in the molding process for the sandwich panel of the embodiment.

Next, as illustrated in FIG. 10, the sliding portions 75A, 75B at the perimeter of the molding surfaces 72A, 72B are induced to project so that the end faces thereof contact the resin sheets P. Cavities are thereby formed between the resin sheets P and the molding surfaces 72A, 72B of the pair of split molds 71A, 71B. The air inside the cavities is then suctioned out through the communicating passages (not illustrated) which have been furnished between the vacuum chambers 73A, 73B and the molding surfaces 72A, 72B. Due to this suction, the two resin sheets P are respectively pressed against the molding surfaces 72A, 72B of the pair of split molds 71A, 71B, forming a shape that conforms to the molding surfaces 72A, 72B, specifically, to the general exterior shape of the sandwich panel 1, as illustrated in FIG. 11.

By adopting a process whereby air present on the resin sheet P side can be suctioned out from the distal ends of the sliding portions 75A, 75B at the perimeter of the molding surfaces 72A, 72B, the resin sheets P can be reliably maintained in a state of contact against the sliding portions 75A, 75B. Moreover, the occurrence of wrinkles can be reduced when the cavities are suctioned to shape the resin sheets P to conform to the molding surfaces 72A, 72B.

Figure 12:
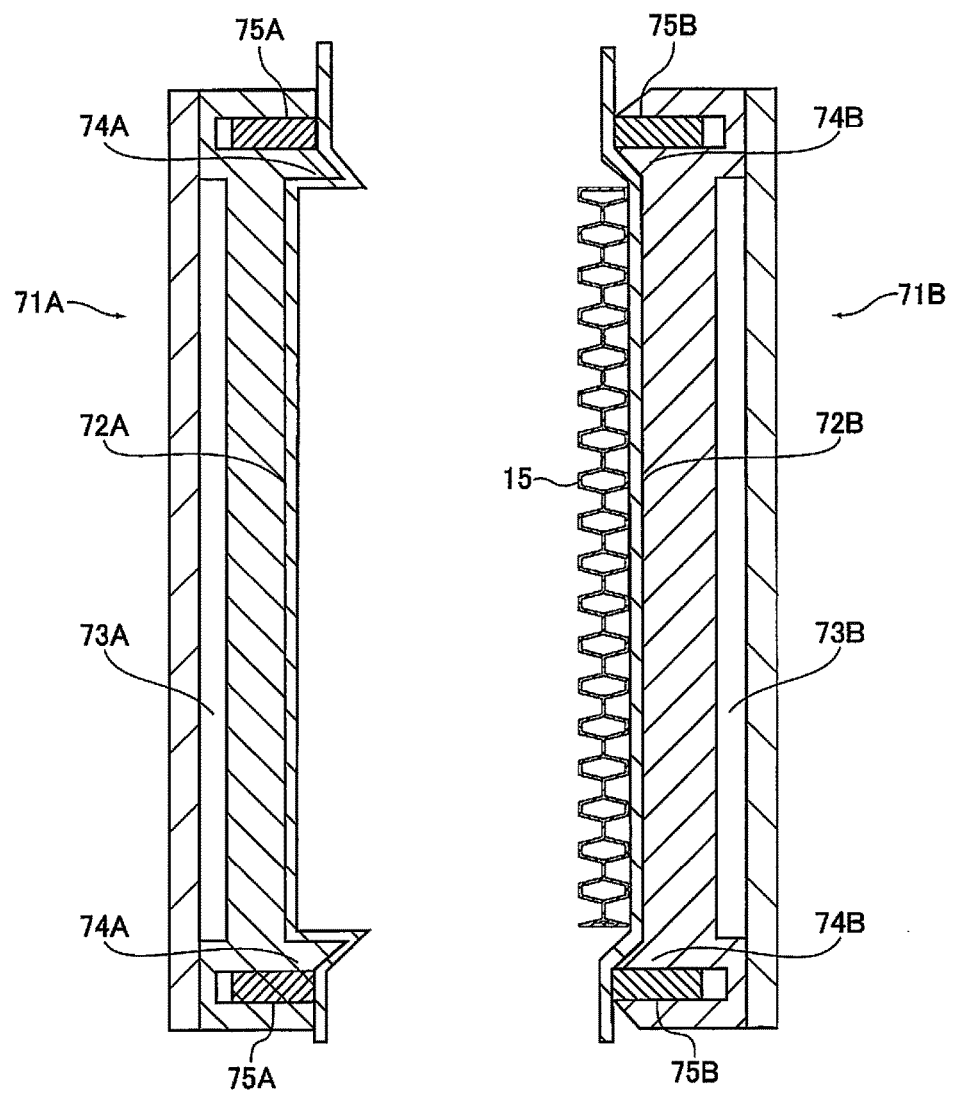
FIG. 12 is a drawing illustrating a state in which the core material has been inserted into the split mold in the molding process for the sandwich panel of the embodiment.

Next, employing a manipulator (not illustrated), the core material 15 is positioned between the pair of split molds 71A, 71B, inserting it so as to press against one of the split molds from the side, as illustrated in FIG. 12 (in FIG. 12, the split mold 71B). The core material 15 is thereby affixed to a resin sheet P. Subsequent to molding, the resin sheets P may shrink by about 1% due to cooling, depending on the resin material. The shapes of the molding surfaces 72A, 72B of the split molds 71A, 71B have been set taking into account this shrinkage. Specifically, the molding surfaces 72A, 72B are set to a size slightly larger than the target dimensions of the resin sheets subsequent to molding. Therefore, the core material 15, which is in a normal temperature state, can be inserted into the split molds with some room to spare.

Figure 13:
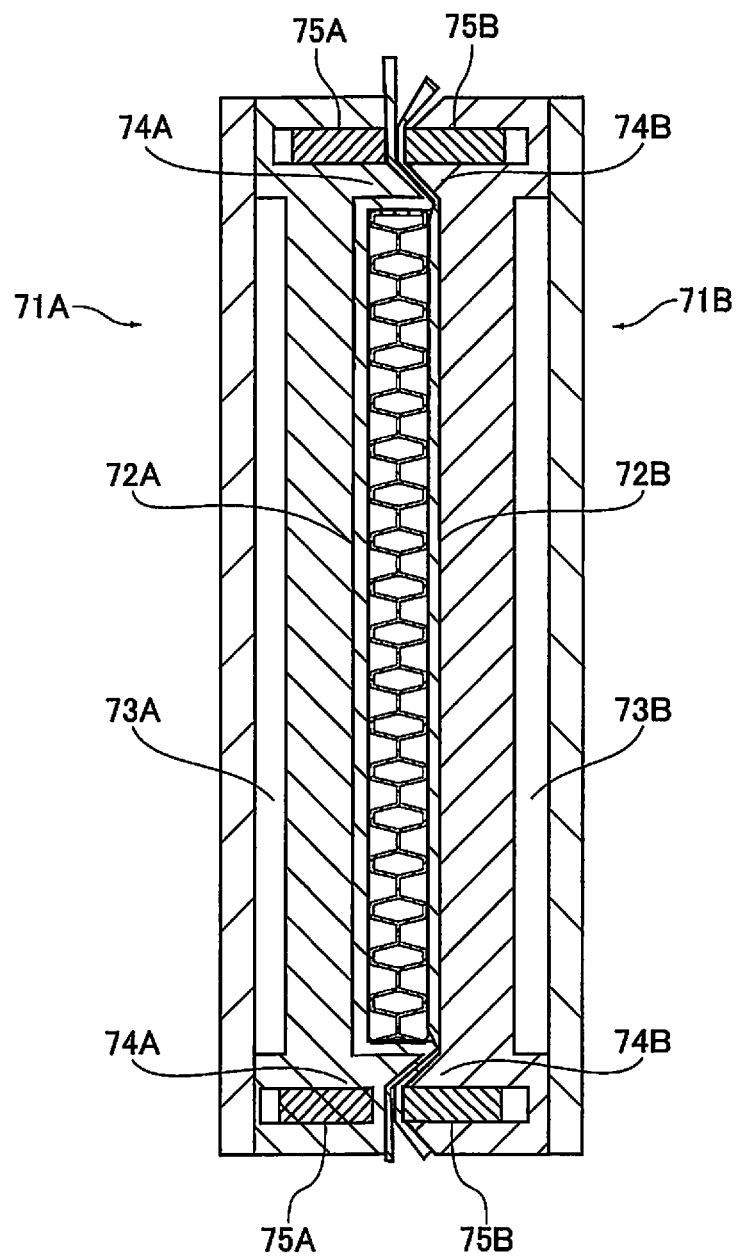
FIG. 13 is a drawing illustrating a state in which the split mold has been moved to the closed position in the molding process for the sandwich panel of the embodiment.

Next, as illustrated in FIG. 13, the pair of split molds 71A, 71B are moved from the open position to the closed position, clamping the mold. The core material 15 which had been affixed to one of the resin sheets P (the one on the right side in the drawing) is thereby affixed to the other resin sheet P (the one on the left side in the drawing) as well. Furthermore, the peripheral edges of the pair of resin sheets are affixed by the pinch-off portions 74A, 74B of the pair of split molds 71A, 71B, forming parting lines PL. During mold clamping, because the previously molded core material 15, which is in a normal-temperature state, is affixed to the resin sheets P in the molten state, the core material 15 is positioned beforehand so as to not experience deformation due to mold clamping.

Finally, the pair of split molds 71A, 71B are moved back to the open position, the molded sandwich panel 1 is released from the molding surfaces 72A, 72B, and the burring which has formed around the parting lines PL is removed by cutting with a cutter or the like. Alternatively, a process may be designed such that burring is cut off by the pinch-off portions 74A, 74B simultaneously with mold clamping. This completes the sandwich panel 1 including the resin sheet SA, the core material 15, and the resin sheet SB which are stacked in order.

As mentioned previously, a glass filler, inorganic filler, or carbon filler may be admixed into the resin sheets P, with the object of increasing rigidity and strength.

By adopting the above method of sandwiching the core material between the split molds, and bringing about adhesion prior to solidification of the extruded resin sheets in the molten state, molding costs can be reduced. The reason is that, as compared for example to a method in which the solidified resin sheets are reheated and melted, then affixed to the core material, the need for a reheating step is obviated, and molding costs can be reduced.

By adopting a process whereby the resin sheets are extruded vertically downward in a molten state, the area occupied by the manufacturing devices can be reduced. The reason is that, in a case of molding by extrusion in the horizontal direction for example, a separate conveyance device is necessary to convey the resin sheets in the horizontal direction, and it is moreover necessary for the conveyance device and the molds to be positioned in-line with the extrusion device in the horizontal direction.

The sandwich panel molding method discussed above may be modified as appropriate. Modification examples of the sandwich panel molding method of the embodiment are described below.

Modification Example 1

Whereas the sandwich panel molding method discussed above described a case of extrusion of resin sheets in a molten state from a pair of T-dies, resin sheets could also be obtained by extruding a cylindrical parison, while cutting it.

Modification Example 2

Whereas the sandwich panel molding method discussed above described a case in which the cavities are formed between the resin sheets P and the molding surfaces 72A, 72B of the pair of split molds 71A, 71B prior to moving the pair of split molds 71A, 71B to the closed position, there is no limitation thereto. It is acceptable for the cavities to be formed by moving the pair of split molds 71A, 71B to the closed position.

Modification Example 3

Whereas the sandwich panel molding method discussed above described a case of suctioning the air inside the cavities in order to press the resin sheets P against the molding surfaces 72A, 72B of the pair of split molds 71A, 71B, there is no limitation thereto. Alternatively, it is acceptable to press the resin sheets P against the molding surfaces 72A, 72B of the pair of split molds 71A, 71B by blowing a fluid, such as air or the like, onto the resin sheets P (blow molding).

Modification Example 4

In the sandwich panel molding method discussed above, the step of pressing the outer layer of the resin sheets in a molten state against the molding surfaces of the split molds employed a method of suctioning from the cavities, or a method relying on blow molding; however, there is no limitation to these methods. It is also acceptable to apply a method in which the core material 15 is employed to press the resin sheets in a molten state against the cavities of the split molds, without forming cavities. This method is described with reference to FIGS. 14 and 15.

Figure 14:
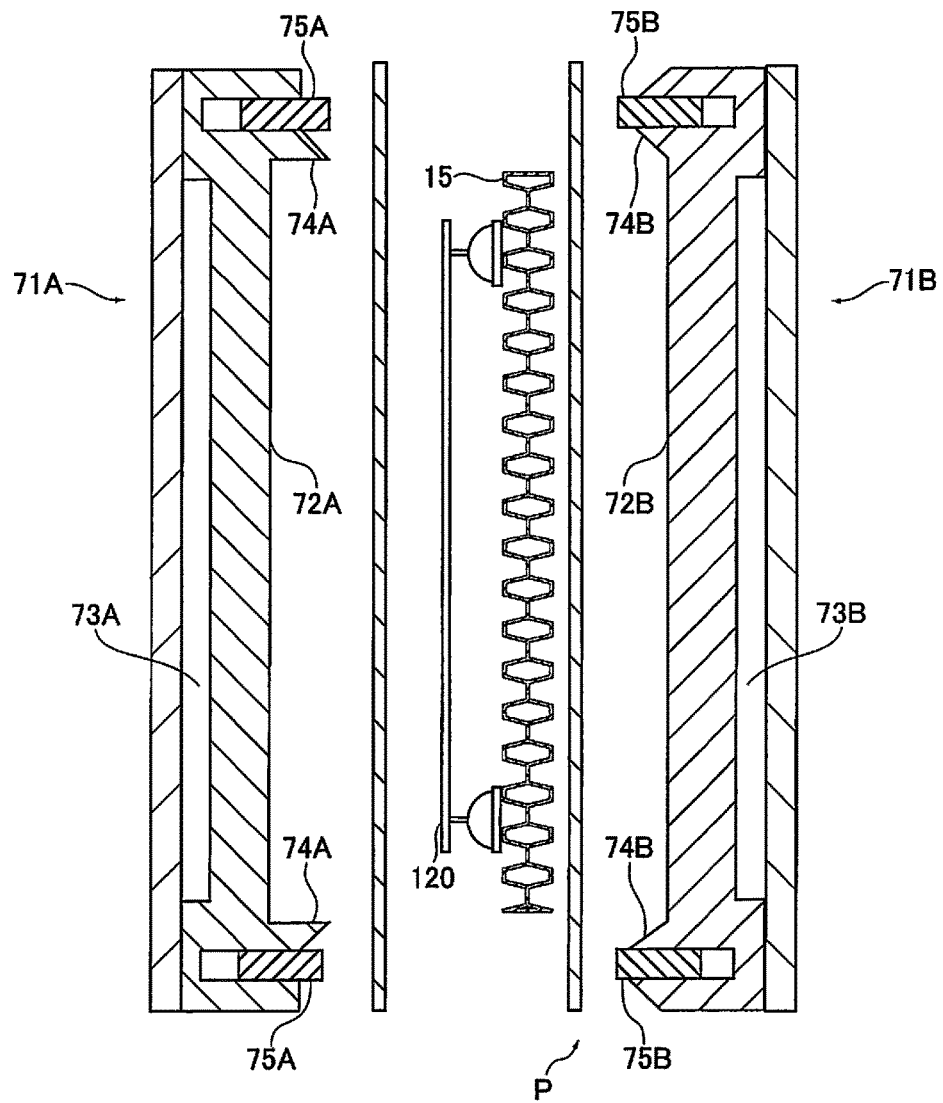
FIG. 14 is a drawing illustrating a state prior to pressing the core material against the molten resin sheet in a modification example of the embodiment.
Figure 15:
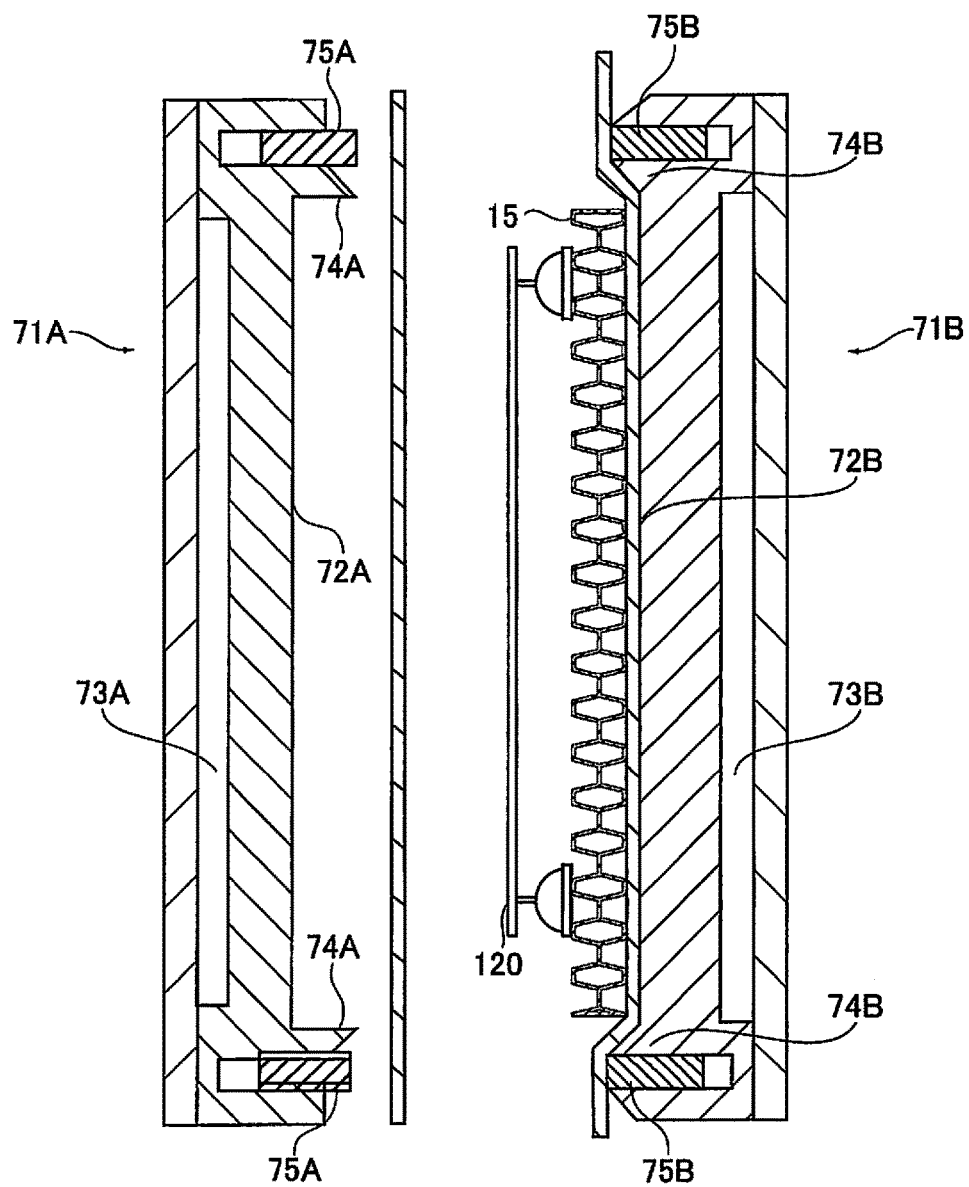
FIG. 15 is a drawing illustrating a state after the core material has been pressed against the molten resin sheet until reaching the molding surface of the split mold in a modification example of the embodiment.

FIG. 14 is a drawing illustrating the core material 15 in a state prior to being pressed against the resin sheets in a molten state. FIG. 15 is a drawing illustrating the core material 15 in a state after being pressed against a resin sheet in a molten state, until reaching the molding surfaces of a split mold.

In the method of the present modification example, firstly, as illustrated in FIG. 14, in a state in which the resin sheets P have been extruded vertically downward in a molten state from the extrusion device 60 (the same state as in FIG. 9), the core material 15, retained by a manipulator 120, is positioned at a position in opposition to the split mold 71B, with a resin sheet P therebetween. Once the core material 15 has been positioned, the manipulator 120 retaining the core material 15 is moved towards the molding surface 72B of the split mold 71B. Thereupon, the core material 15 is brought into contact with the resin sheet P in the molten state, affixing the core material 15 and the resin sheet P. At the moment of contact with the core material 15, the resin sheet P in the molten state is kept at relatively high temperature due to the lack of contact with the split mold 71B, which has high thermal conductivity. Therefore, the core material 15 and the resin sheet P adhere tightly.

As the manipulator 120 is moved further along, and the outer layer of the resin sheet P reaches the molding surface 72B of the split mold 71B, the state illustrated in FIG. 15 is assumed. At this time, the outer layer of the resin sheet P is pressed by the manipulator 120 against the molding surface 72B, with the core material 15 therebetween. The manipulator 120 is then detached from the core material 15.

Subsequent steps are the same as those discussed previously.

Specifically, as illustrated in FIG. 13, the pair of split molds 71A, 71B are moved from the open position to the closed position, clamping the mold. The core material 15 which has been affixed to one of the resin sheets P (the one on the right side in the drawing) is now affixed to the other resin sheet P as well (the one on the left side in the drawing). The pair of resin sheets are then pressed against the molding surfaces 72A, 72B of the pair of split molds 71A, 71B, forming a shape that conforms to the molding surfaces 72A, 72B, specifically, to the general exterior shape of the sandwich panel 1, as illustrated in FIG. 11. Furthermore, in the pinch-off portions 74A, 74B of the pair of split molds 71A, 71B, the peripheral edges of the pair of resin sheets P are affixed, forming parting lines PL. Finally, the pair of split molds 71A, 71B are moved back to the open position, the molded sandwich panel 1 is released from the molding surfaces 72A, 72B, and the burring which has formed around the parting lines PL is removed by cutting with a cutter or the like. This completes the sandwich panel 1 including the resin sheet SA, the core material 15, and the resin sheet SB which are stacked in order.

While the present invention has been described in detail above in terms of the present preferred embodiment, the resin panel and sandwich panel of the present invention are not limited to the aforedescribed embodiment, and various improvements and modifications of the present invention are possible without departing from the scope and spirit thereof. For example, in the present embodiment, a case of use as the core material of a sandwich panel was described as an example of the resin panel of the present invention; however, applications for the resin panel are not limited thereto. In applications where skin sheets are not necessary, the resin panel could be used by itself.

1 Sandwich panel
SA, SB Resin sheet
15 Core material (resin panel)
15A First structure
15B Second structure
150a, 150b Protrusions
60 Extrusion device
70 Mold clamping device
61A, 61B T die
65A, 65B Roller
71A, 71B Split mold
72A, 72B Molding surface
73A, 73B Vacuum chamber
74A, 74B Pinch-off portion
75A, 75B Sliding portion
90 Molding device
P Resin sheet

What is claimed is:
1. A method of making a resin panel comprising
extruding a first molten resin material and a second molten resin material in a vertically downward direction between a pair of split molds, molding surfaces of the split molds including corresponding molding protrusions extending therefrom;
moving a first of the pair of split molds and a second of the pair of split molds toward one another with the first and second molten resin materials extending therebetween;
blowing the first molten resin material against the first of the pair of split molds forming a first structure; and
blowing the second molten resin material against the second of the pair of split molds forming a second structure,
wherein each of the first and second structures is formed with corresponding reference surfaces that serve as a front surface and a back surface of the resin panel, respectively,
the blowing of the first and the second molten resin materials further includes forming a plurality of protrusions protruding inwardly from respective ones of the reference surfaces corresponding to the molding protrusions formed on the molding surfaces of the split molds, the protrusions of one of the first and second structures facing the protrusions of the other of the first and extruded structures, and the first and second structures being joining such that apical portions of the protrusions of one of the first and second structures abut apical portions of the protrusions of the other of the first and second structures, and jutting portions having a linear shape are formed between adjacent protrusions of each of the first and second structures during the blowing of the first and second molten resin materials, the jutting portions extending perpendicular to the apical portions, and, the molding surfaces of the split molds not having jutting portions formed thereon.

2. The method of making a resin panel according to claim 1, wherein
the blowing of the first and second molten resin materials causes the formation of the jutting portions to include an array of first jutting portions and an array of second jutting portions, the first jutting portions being collinear with one another or parallel to one another and the second jutting, portions being collinear with one another or parallel to one another such that pairs of one of the first jutting portions and one of the second jutting portions do not extending in opposite directions.

3. The method of making a resin panel according to claim 1, wherein
the blowing of the first and second molten resin materials causes the formation of the jutting portions to include a plurality of groups of jutting portions, where each group of jutting portions are collinear, and where each group of the jutting portions extends in a direction that is parallel to others of the groups of jutting portions, and all of the groups of jutting portions extend in the vertically downward direction.

4. The method of making a resin panel according to claim 1, wherein
the blowing of the first and second molten resin materials causes the formation of the plurality of protrusions to form first rows of protrusions and second rows of protrusions such that in a first direction the protrusions in the first rows of protrusions are spaced apart from adjacent projections in the second rows of protrusions by a first distance and in a second direction perpendicular to the first direction the protrusions in the first rows of protrusions are spaced apart from adjacent projections in the second rows of protrusions by a second distance greater than the first distance.

5. The method, of making a resin panel according to claim 1, wherein the blowing of the first and second molten resin materials causes the formation of the plurality of protrusions such that each protrusion has a hexagonal shape as viewed from an end thereof, and each one of the jutting portions extends from an apex of the hexagonal shape of a respective one of the adjacent protrusions.

6. The method of making a resin panel according to claim 1, wherein the extruding of the first molten resin material and the second molten resin material includes extruding a single molten resin material as a cylindrical parison with portions of the cylindrical parison defining the first molten resin material and the second molten resin material.

7. A method, of making a resin panel comprising extruding a first molten resin material and a second molten resin material in a vertically downward direction between a pair of split molds, molding surfaces of the split molds including corresponding molding protrusions extending therefrom;

moving a first of the pair of split molds and a second of the pair of split molds toward one another with the first and second molten resin materials extending therebetween;

applying vacuum to the first molten resin material against the first of the pair of split molds forming a first structure; and applying vacuum to the second molten resin material against the second of the pair of split molds forming a second structure, wherein, each of the first and second structures is formed with corresponding reference surfaces that serve as a front surface and a back surface of the resin panel, respectively, the applying of vacuum to the first and the second molten resin materials further includes forming a plurality of protrusions protruding inwardly from respective ones of the reference surfaces corresponding to the molding protrusions formed on the molding surfaces of the split molds, the protrusions of one of the first and second structures facing the protrusions of the other of the first and extruded structures, and the first and second structures being joining such that apical portions of the protrusions of one of the first and second structures abut apical portions of the protrusions of the other of the first and second structures, and jutting portions having a linear shape are formed between adjacent protrusions of each of the first and second structures during the blowing of the first and second molten resin materials, the jutting portions extending perpendicular to the apical portions, and, the molding surfaces of the split molds not having jutting portions formed thereon.

8. The method of making a resin panel according to claim 7, wherein the extruding of the first molten resin material and the second molten resin material includes extruding a single molten resin material as a cylindrical parison with portions of the cylindrical prison defining the first molten resin material and the second molten resin material.

* * * * *